(12) United States Patent  
Au et al.

(10) Patent No.: US 9,081,668 B2  
(45) Date of Patent: Jul. 14, 2015

(54) ARCHITECTURE TO ALLOW EFFICIENT STORAGE OF DATA ON NAND FLASH MEMORY

(71) Applicant: Marvell World Trade Ltd., St. Michael (BB)

(72) Inventors: Siu-Hung Frederick Au, Fremont, CA (US); Fei Sun, Santa Clara, CA (US); Hyunsuk Shin, San Diego, CA (US); Chi Kong Lee, Fremont, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 189 days.

(21) Appl. No.: 13/804,099

(22) Filed: Mar. 14, 2013

(65) Prior Publication Data

US 2013/0246890 A1  Sep. 19, 2013

Related U.S. Application Data

(60) Provisional application No. 61/612,140, filed on Mar. 16, 2012.

(51) Int. Cl.
*G11C 29/00* (2006.01)
*G06F 12/02* (2006.01)
(Continued)

(52) U.S. Cl.
CPC ........ *G06F 12/0246* (2013.01); *G06F 11/1008* (2013.01); *G06F 11/1068* (2013.01); *G06F 3/064* (2013.01); *G06F 3/0608* (2013.01); *G06F 3/0679* (2013.01); *G06F 11/108* (2013.01); *G06F 2212/7202* (2013.01); *G06F 2212/7208* (2013.01); *Y02B 60/1225* (2013.01)

(58) Field of Classification Search
CPC ............ G06F 11/1076; G06F 11/1008; H05K 999/99; H05K 2029/0411; H05K 11/106
USPC .......................................................... 714/764
See application file for complete search history.

(56) References Cited

U.S. PATENT DOCUMENTS 8,639,969 B2 *  1/2014  Kawaguchi ................... 714/6.1
2003/0188097 A1  10/2003  Holland et al.
(Continued)

FOREIGN PATENT DOCUMENTS

WO  WO-2010054410 A2  5/2010
WO  WO-2010078167 A2  7/2010

OTHER PUBLICATIONS

International Search Report and Written Opinion dated Jul. 23, 2013 in International Application No. PCT/US2011/031114.
(Continued)

*Primary Examiner* — Albert Decady
*Assistant Examiner* — Enam Ahmed

(57) ABSTRACT

Systems, methods, apparatus, and techniques are provided for writing data to a storage medium. A stripe of the storage medium is interfaced via one or more data transfer channels, where the stripe comprises a plurality of pages of the storage medium. A data stream is received and the data stream is portioned into a plurality of allocation units (AUs), where each AU in the plurality of AUs has a pre-determined byte length. A first portion of a selected AU from the plurality of AUs is written to a first page of the plurality of pages and a second portion of the selected AU is written to a second page of the plurality of pages by consecutively writing bytes of the selected AU from a starting byte on the first page to an ending byte on the second page.

20 Claims, 7 Drawing Sheets

(51) Int. Cl.
*G06F 11/10* (2006.01)
*G06F 3/06* (2006.01)

(56) References Cited

U.S. PATENT DOCUMENTS

| | | |
|---|---|---|
| 2004/0205387 A1 | 10/2004 | Kleiman et al. |
| 2006/0080505 A1 | 4/2006 | Arai et al. |
| 2008/0162811 A1 | 7/2008 | Steinmetz et al. |
| 2008/0195810 A1 | 8/2008 | Wu et al. |
| 2011/0258380 A1 | 10/2011 | Goss et al. |
| 2013/0246892 A1 | 9/2013 | Au et al. |
| 2013/0254627 A1* | 9/2013 | Jeddeloh ............ 714/764 |
| 2014/0143634 A1* | 5/2014 | Post ................ 714/764 |

OTHER PUBLICATIONS

International Search Report and Written Opinion dated Jul. 18, 2013 in International Application No. PCT/US2013/031182.

* cited by examiner

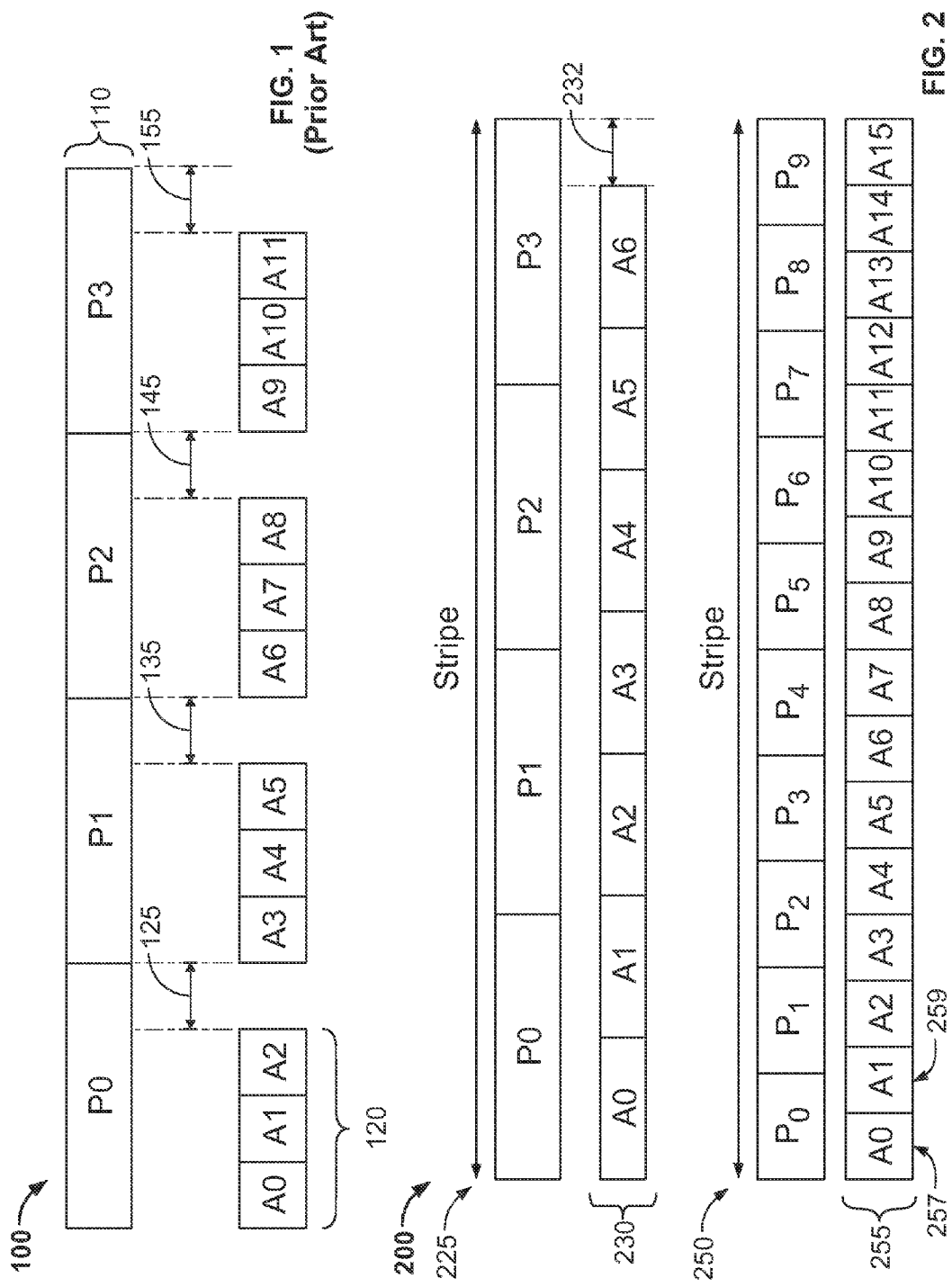

| Original AU/Page | 2 |
|---|---|
| Original Sec Size | 512 |
| Original Sec/AU | 8 |

| Page | Spares | Sector | Sec/AU | Spares Per AU | AU | | Write Stripe Size (Pages) | Write Stripe Size (Bytes) | Waste (Bytes) | Waste (%) |
|---|---|---|---|---|---|---|---|---|---|---|
| 8192 | 1024 | 520 | 8 | 520 | 4680 | | 1 | 9216 | 4536 | 49% |
| | | | | | | | 2 | 18432 | 4392 | 24% |
| | | | | | | | 3 | 27648 | 4248 | 15% |
| | | | | | | | 4 | 36864 | 4104 | 11.1328% |
| | | | | | | | 16 | 147456 | 2376 | 1.6113% |
| 8192 | 1024 | 528 | 8 | 528 | 4752 | | 1 | 9216 | 4464 | 48% |
| | | | | | | | 2 | 18432 | 4176 | 23% |
| | | | | | | | 3 | 27648 | 3888 | 14% |
| | | | | | | | 4 | 36864 | 3600 | 9.7656% |
| | | | | | | | 16 | 147456 | 144 | 0.0977% |

FIG. 4

ARCHITECTURE TO ALLOW EFFICIENT STORAGE OF DATA ON NAND FLASH MEMORY

CROSS-REFERENCE TO RELATED APPLICATIONS

This patent document claims the benefit of, and priority to, U.S. Provisional Application No. 61/612,140, filed Mar. 16, 2012, the disclosure of which is hereby incorporated by reference herein in its entirety.

FIELD OF USE

This disclosure relates to techniques for efficiently writing data to a storage medium including a NAND flash storage medium.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

A solid state drive (SSD) reads and writes data from devices such as NAND flash memory devices or dynamic random access memory (DRAM) devices. In a case of NAND flash memory, the SSD typically includes an SSD controller with a number of data channels for transferring data to and from the NAND flash memory. Further, the SSD controller typically executes firmware that manages data in fixed byte size units known as allocation units (AUs). Traditionally, data is written to a given page of the NAND flash memory in a single operation and the write operation includes a number of bytes that is an integer multiple of the byte size of an AU. When a page size of the NAND flash is not an integer multiple of the AU size, the memory of the NAND flash may be underutilized.

SUMMARY OF THE DISCLOSURE

Systems, methods, apparatus, and techniques are provided for writing data to a storage medium. A system includes interface circuitry configured to interface with a stripe of the storage medium via one or more data transfer channels, where the stripe comprises a plurality of pages of the storage medium. The system further includes partition circuitry configured to receive a data stream and partition the data stream into a plurality of AUs, each AU in the plurality of AUs having a pre-determined byte length. The system further includes write circuitry configured to write a first portion of a selected AU from the plurality of AUs to a first page of the plurality of pages and a second portion of the selected AU to a second page of the plurality of pages by consecutively writing bytes of the selected AU from a starting byte on the first page to an ending byte on the second page.

In some implementations, the write circuitry is configured to write the plurality of AUs to the stripe based on an ordered sequence of the pages. In some implementations, the write circuitry includes a write buffer and the write circuitry is configured to write to the storage medium after an amount of data equal to a length of the stripe accumulates in the write buffer. In some implementations, the system includes error correction (ECC) circuitry configured to read data stored in the stripe of the storage medium and calculate an error correction sequence corresponding to the read data. In some implementations, the write circuitry is configured to receive the error correction sequence and write the error correction sequence to a last page of the stripe of the storage medium.

A method includes interfacing with a stripe of a storage medium via one or more data transfer channels, where the stripe includes a plurality of pages of the storage medium. The method further includes receiving a data stream and partitioning the data stream into a plurality of AUs, each AU in the plurality of AUs having a pre-determined byte length. The method further includes writing a first portion of a selected AU from the plurality of AUs to a first page of the plurality of pages and a second portion of the selected AU to a second page of the plurality of pages by consecutively writing bytes of the selected AU from a starting byte on the first page to an ending byte on the second page.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which:

FIG. 1 depicts an illustrative prior art data allocation technique for a storage medium in accordance with some embodiments;

FIG. 2 depicts two illustrative assignments of AUs to pages in a storage medium in accordance with some embodiments;

FIG. 4 depicts a percentage of underutilization in a storage device ("waste") on a storage medium for two different AU values and for various stripe sizes in accordance with some embodiments;

DETAILED DESCRIPTION OF THE DISCLOSURE

Figure 3:
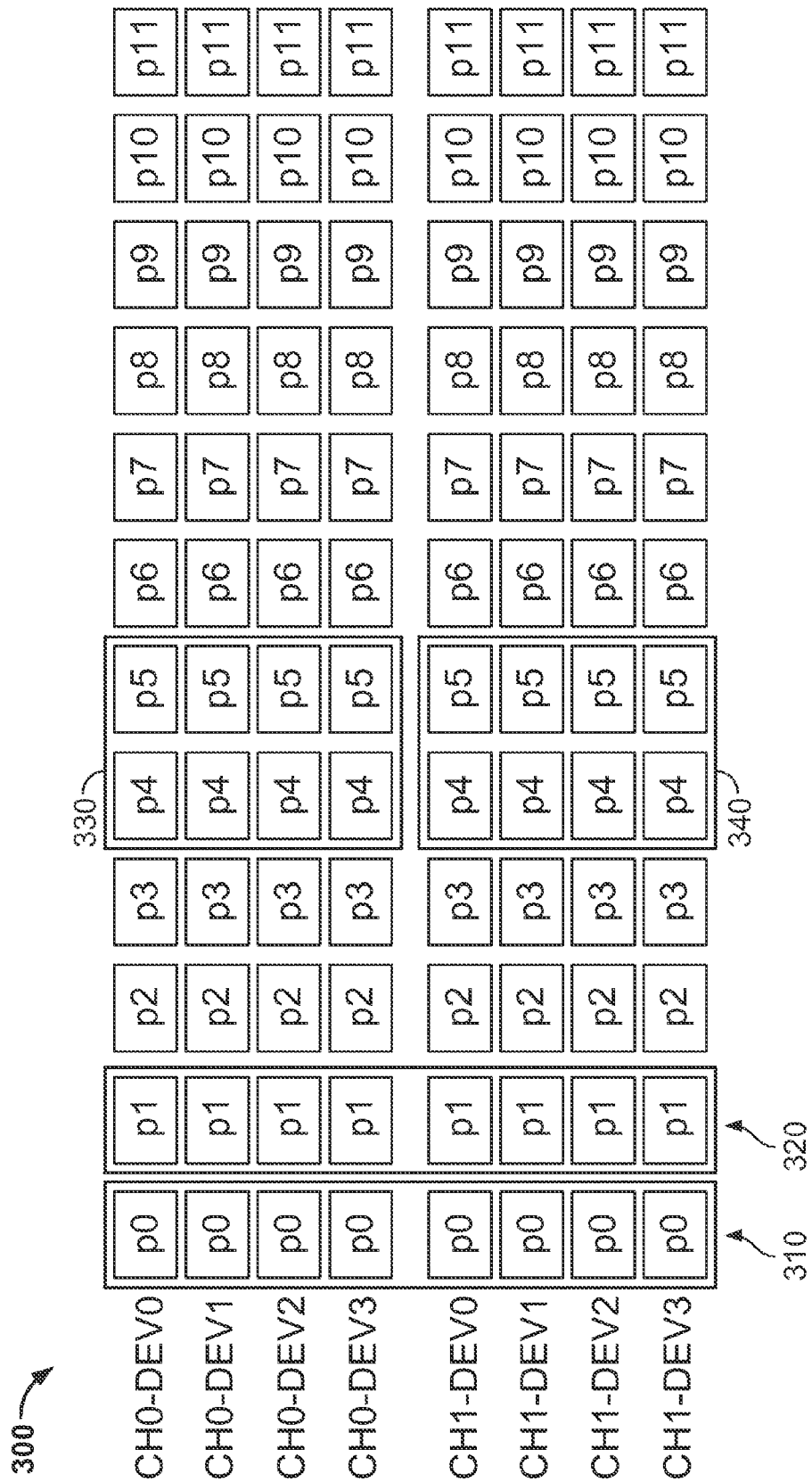
FIG. 3 depicts illustrative techniques that may be used by firmware of a SSD controller for assigning pages to a single stripe in accordance with some embodiments.

Disclosed herein are techniques for increasing utilization of a storage medium, including a NAND flash storage medium, based on a stripe-based logical structure.

FIG. 1 depicts an illustrative prior art data allocation technique for a storage medium in accordance with some embodiments. In particular, illustration 100 depicts a set of four pages 110 belonging to a storage medium, with individual pages labeled P0, P1, P2, and P3. The illustration 100 further depicts a manner in which a total of 12 AUs are written by an SSD controller to the set of four pages 110. For illustrative purposes, suppose that each page of the set of four pages 110 has a size of 2,048 bytes and that each AU has a size of 520 bytes. In typical systems, a given AU may not cross pages of the storage device and must instead be written entirely to a single page. Accordingly, in the illustration 100, a block 120 of AUs that includes A0, A1, and A2 is written to the first 520×3=1,560 bytes of the page P0 of the storage device. However, because only 488 bytes remain in page P0 after the write operation, there is not space to write an entirety of A3 to the page P0.

Accordingly, A3 is written instead to a new page, P1, of the storage medium. In particular, as depicted in FIG. 1, each of pages P0, P1, P2, and P3 store exactly three AUs. Thus, because storage of an individual AU may not cross any two pages of the storage medium, storage space is underutilized on each of pages P0, P1, P2, and P3. Specifically, underutilized bytes are denoted by bytes 125, 135, 145, and 155 in FIG. 1. In particular, each of pages P0, P1, P2, and P3 includes 488 bytes of unused space out of a total of 2048 bytes. Thus, each of pages P0, P1, P2, and P3 is underutilized by approximately 23-percent.

Thus, in applications which a page size of a storage medium is not an integer multiple of an AU size, no multiple number of AUs will exactly occupy all the bytes of a page of the storage medium and the storage medium will thus be underutilized. Accordingly, a stripe-based technique, as described in the present disclosure, is presented to address such disadvantages and increase utilization of a storage medium, including a NAND flash storage medium, for systems in which a page size is not an integer multiple of an AU size.

A stripe is grouping of a specified number of pages of a storage medium (e.g., 2, 5 or 10 pages). Advantageously, by using a stripe logical framework, firmware of an SSD controller allows AUs to break across pages of a storage device while still reading and accessing all data within such AUs properly. Let M denote a number of pages in a stripe and let N denote a number of AUs in a stripe. Then, ideally, to achieve full utilization of the storage medium, the following equation should hold $$M*(\text{Page Size in Bytes}) = N*(\text{AU Size in Bytes}). \quad (1)$$

However, in practice, values of M and/or N required to satisfy equation (1) may be too large or otherwise impractical for implementation. However, even when values of M and N are used that do not satisfy equation (1), above, a storage medium is still more effectively utilized based on the stripes framework than in a scheme in which individual AUs are not allowed to break across pages. This will be explained below.

Some advantages of a stripe-based approach are depicted by illustration 200 of FIG. 2. Specifically, illustration 225 depicts the case that M=4 and N=7 for the case of a page size of 2,048 bytes and an AU size of 1,030 bytes. As shown in the illustration 225, firmware of the SSD controller allows individual AUs 230 to break across pages and so the first three pages of the storage medium (labeled P0, P1, and P2, respectively) are fully utilized. However, because equation (1) is not satisfied, there is some underutilization of the NAND storage device with respect to the last page, P4. In particular, as depicted in FIG. 2, page P4 is not fully written to and a certain number of bytes 232 remain blank. The seven AUs 230 occupy 7,210 bytes of the total of 8,192 bytes of the stripe depicted in the illustration 225, for a total utilization of approximately 88-percent. In comparison, if AUs were not able to break across pages, the total utilization of the NAND flash storage would be 1,030 out of every 2,048 bytes per page, or approximately slightly more than 50-percent utilization.

As a second illustration of the stripe-based approach, the illustration 250 depicts the case that M=10 and N=16 for the case of a page size of 832 bytes and an AU size of 520 bytes. In this case, the equation (1) is satisfied, and so the NAND storage device is fully utilized. In particular, page P9 (the last page of the stripe depicted in the illustration 250) is fully written to. In comparison, if AUs were not able to break across pages, the total utilization of the NAND flash storage would be 520 out of every 832 bytes, or approximately slightly more than 62-percent utilization.

The logical grouping of pages into stripes is performed by firmware of the SSD controller, and, in some implementations, the firmware may assign pages from only a single storage device to a stripe, while, in other implementations, the firmware may assigned pages from multiple storage devices to a single stripe. Additionally or alternatively, the firmware may assign pages that are accessible through multiple different data transfer channels to a single stripe.

FIG. 3 depicts illustrative techniques that may be used by firmware of a SSD controller for assigning pages to a single stripe in accordance with some embodiments. In particular, illustration 300 depicts a case where an SSD controller may write 96 pages spread across four different devices (labeled DEV0, DEV1, DEV2, and DEV3, respectively) and using two different channels (labeled CH0 and CH1, respectively). The different devices of FIG. 3 may correspond to, e.g., different memory or storage devices, each of which the SSD controller can independently read from and write to. Illustration 300 depicts the case that M=8 for two different strategies for assigning pages to stripes across channels and devices.

A first stripe assignment strategy is to allocate stripes across both devices and channels. This is depicted by stripe 310 and stripe 320 in FIG. 3. A second alternate stripe assignment strategy is to require that all pages assigned to a given stripe belong to a common channel (while being spread across devices). This is illustrated by stripe 330 for the case that the channel is CH0 and stripe 340 for the case that the channel is CH1. As would be understood by one of ordinary skill in the art, based on the disclosure and teachings herein, the assignment strategies depicted in FIG. 3 are just two of many types of allocation strategies that may be used. In practice, any allocation strategy may be used (a mapping of a group of any of the pages depicted in the FIG. 3 to a single stripe) which contains both an integral number of AUs and an integral number of pages.

To access data stored in stripes and to write data into stripes, firmware must be able to generate an address of a first byte of each stored AU (or an equivalent address). To do so, the firmware uses two addressing components. First, a stripe ID, which is used to identify a start of each stripe of data stored in the storage device, and an AU index, which is used to identify an offset associated with a given AU. For example, in a storage device with P total stripes and N AUs per stripe, a given AU may be addressed by a stripe ID value from 0 to P−1 and an AU index value from 0 to N−1. Further, to access physical memory addresses, the firmware may reference a Flash Transition Layer (FTL) table that maps stripe ID and AU index values to physical memory addresses (and a physical memory address may itself be represented by a page identification number and a page offset).

For various applications, firmware will associate a set of addresses with a given AU. For an AU that is written entirely within a single page, the firmware may maintain a single entry with a form (stripe ID, first byte, last byte). For example, referring back to FIG. 2, for the AU A0 257, the firmware may maintain a single entry of (0, 0, 519) denoting that the AU belongs to a first stripe, and occupies bytes 0 through 519 of that stripe. On the other hand, for AU A1 259 of FIG. 2, which breaks across multiple stripes, two entries are used by the firmware. Thus, the AU A0 257 may be represented by the entry (0, 0, 519) corresponding to bytes that the AU occupies in the first page, and the AU A1 259 may be represented by the entry (0, 520, 831) and (1, 0, 207) corresponding to bytes that the AU occupies in the first and second pages, respectively.

An SSD controller may translate the stripe ID and AU index values into a page address and a page offset (or possibly two pairs of page addresses and page offsets in a case that the AU spans two pages) using any suitable combination of firmware and hardware. In a first implementation, the firmware provides the stripe ID and AU index to hardware of the SSD controller. The hardware then does the decoding of the stripe ID and AU index values into page address(es) and a page offset(s). For example, the hardware will generate two page reads in a case that an AU crosses a page boundary. In a second implementation, the firmware itself decodes the stripe ID and AU index values into page address and page offset value(s). In this case, the firmware itself generates two page reads in a case that an AU crosses a page boundary.

An advantage of the first implementation, which makes use of hardware for address decoding, is that it leaves the firmware free to handle other operations and so overall system performance may be faster than in the second implementation, which uses firmware for decoding. A disadvantage of the first implementation is that the hardware must be aware of potentially corrupt or unusable address values and this may require that significant resources be used to provide such information to the hardware. Advantageously, the disclosed stripe structure does not constrain a manner in which the SSD controller performs reads of AUs.

FIG. 4 depicts a percentage of underutilization in a storage medium (waste) for two different AU values and for various stripe sizes in accordance with some embodiments. In particular, table 410 depicts waste values for an AU size 405 of 4,680 bytes and stripe sizes of 1, 2, 3, 4, and 16 pages, and table 420 depicts waste values for an AU size 415 of 4,752 bytes and for stripe sizes of 1, 2, 3, 4, and 16 pages. In both cases, the page size is 9,216 bytes. As an example of how waste values are calculated, consider row 418 corresponding to an AU size of 4,680 bytes and a stripe size of three pages (or 9,216×3=27,648 bytes). In this case, a maximum of 5 AUs may be written to a stripe (i.e., a total of 23,400 bytes) without exceeding the byte size of the stripe. Thus, 4,248 out of the 27,648 bytes of the stripe are left unused, for a waste of approximately 15-percent.

As depicted in FIG. 4, for cases of AU size 4,680 bytes and 4,752 bytes, the waste decreases as stripe size increases until the stripe size reaches 16 pages in length. As depicted in FIG. 4, the waste for AU size 405 of 4,680 bytes is approximately 1.6113-percent, while the waste for AU size 415 of 4,752 bytes is approximately 0.0977-percent. Thus, using the technique described in the present disclosure in relation to FIG. 4, waste can typically be reduced to a relatively small percentage value for even moderate stripe sizes. In one arrangement, the waste bytes are not left empty, but rather are used to store error correction code (ECC) bytes. For example, in the table 410 and with a stripe size of 16 pages, 2,376 bytes are not allocated to an AU. These bytes may be used to store ECC bytes to ensure reliability of the 147,456−2,376=145,080 bytes that are used.

Figure 5:
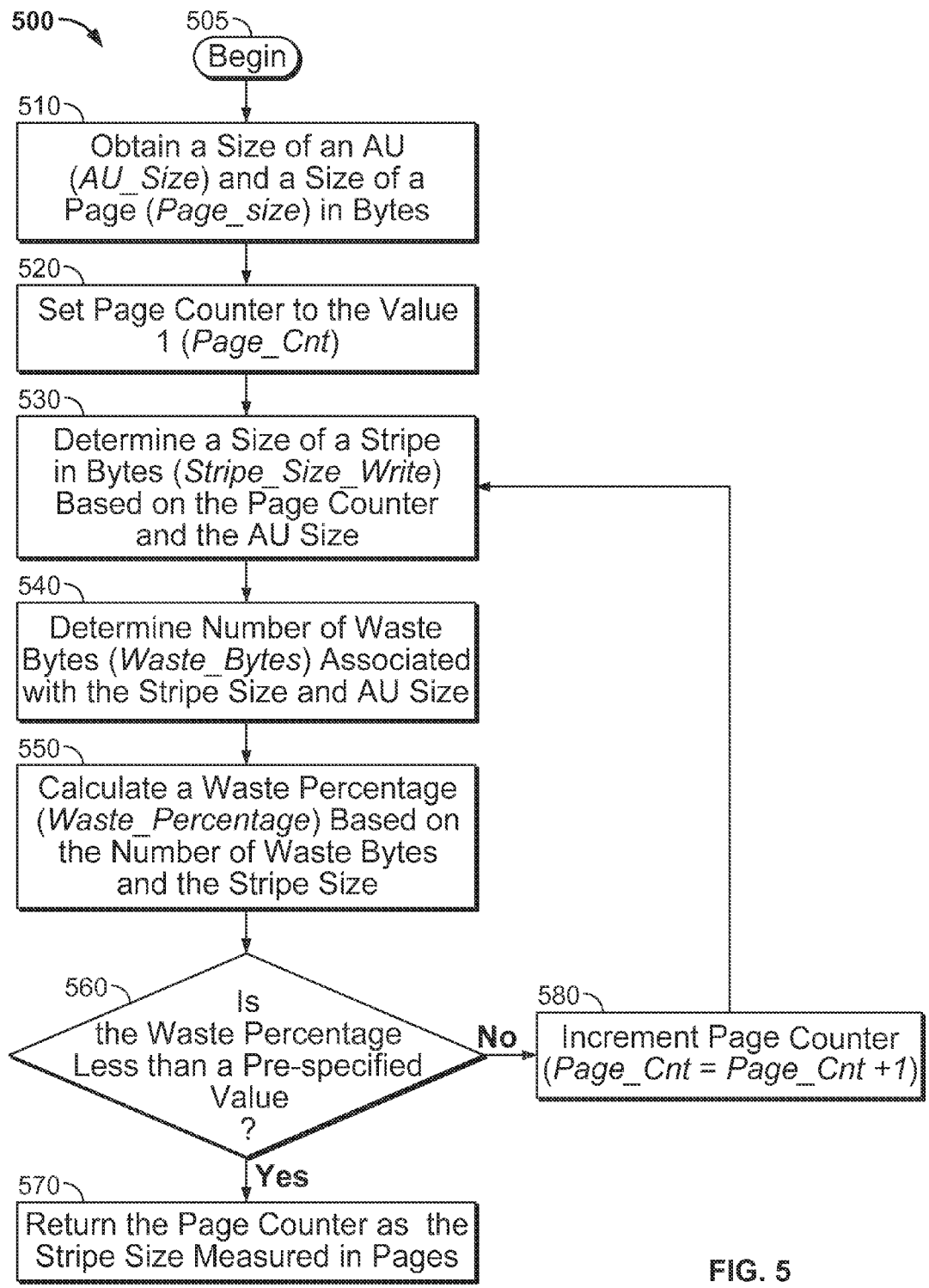
FIG. 5 depicts an illustrative process performed by firmware of an SSD controller for determining a number of pages of storage medium to be included in a stripe in accordance with some embodiments.

FIG. 5 depicts an illustrative process performed by firmware of an SSD controller for determining a number of pages of a storage medium to be included in a stripe in accordance with some embodiments. Process 500 begins at 505. At 510, a size of an AU and a size of page, both measured in bytes and denoted AU_Size and Page_Size, respectively, are obtained by the firmware. For example, in an arrangement, the parameter AU_Size may be 4,680 bytes and the parameter Page_Size may be 9,216 bytes.

At 520, the firmware sets a value of a page counter, denoted Page_Cnt, equal to the value 1. The page counter denotes a current candidate value of a total number of pages to include in a stripe. At 530, the firmware determines a current size of a stripe size in bytes, denoted Stripe_Size_Write, based on the parameters AU_Size and Page_Cnt. In particular, the firmware determines this quantity according to the relationship Stripe_Size_Write=AU_Size×Page_Cnt.

At 530, the firmware determines a number of waste bytes, denoted Waste_Bytes, associated with the stripe size and the AU size. To do so, the firmware determines a maximum integer number of AUs that fit into a stripe. For example, if the stripe size is 27,648 bytes and the AU size is 4,680 bytes, then the firmware determines that a maximum of five AUs will fit in the stripe. Next, based on the size of the maximum number of AUs that will fit in a stripe, the firmware determines the number of waste bytes. For example, since a maximum of five AUs of size 4,680 bytes each fit into a stripe of size 27,648 bytes, there are 27,648−5×(4,680)=4,248 waste bytes in the above example.

At 540, the firmware determines a waste percentage, denoted Waste_Percentage, based on the number of waste bytes determined at 540 and the stripe size determined at 530. Specifically, the firmware determines the waste percentage according to the relationship Waste_Percentage=100(Waste_Bytes/Stripe_Size_Write).

For example, if the number of waste bytes is 4,248 bytes and the stripe size is 27,648 bytes, then waste percentage is determined to be approximately 15-percent. At 550, it is determined if the waste percentage determined at 540 is less than a pre-specified value (e.g., one-percent, three-percent, or five-percent). If the waste percentage is determined to be less than the pre-specified value at 560, then the process 500 proceeds to 570, where the firmware determines that a stripe is to include a number of pages equal to the current value of the page counter Page_Cnt. On the other hand, if the waste percentage is determined to be greater than the pre-specified value at 560, then the process 500 proceeds to 580, where the page counter is incremented by a value 1. In this latter case, the process 500 proceeds to 530.

In some implementations, the firmware of the SSD controller as described herein uses a write buffer to regulate the writing of data to pages of a storage medium. In these implementations, the write buffer accumulates enough data to write a complete stripe before writing at all to the medium. However, even when a write buffer is employed, partial stripes may be written. Partial stripes may be writing, e.g., when a power down event occurs after a start of the writing of a stripe but before the writing has completed. Further, in some implementations, the SSD controller may not employ a write buffer at all or may employ a write buffer of size less than a size of a stripe. In this case, partial stripes will routinely be written to medium.

Figure 6:
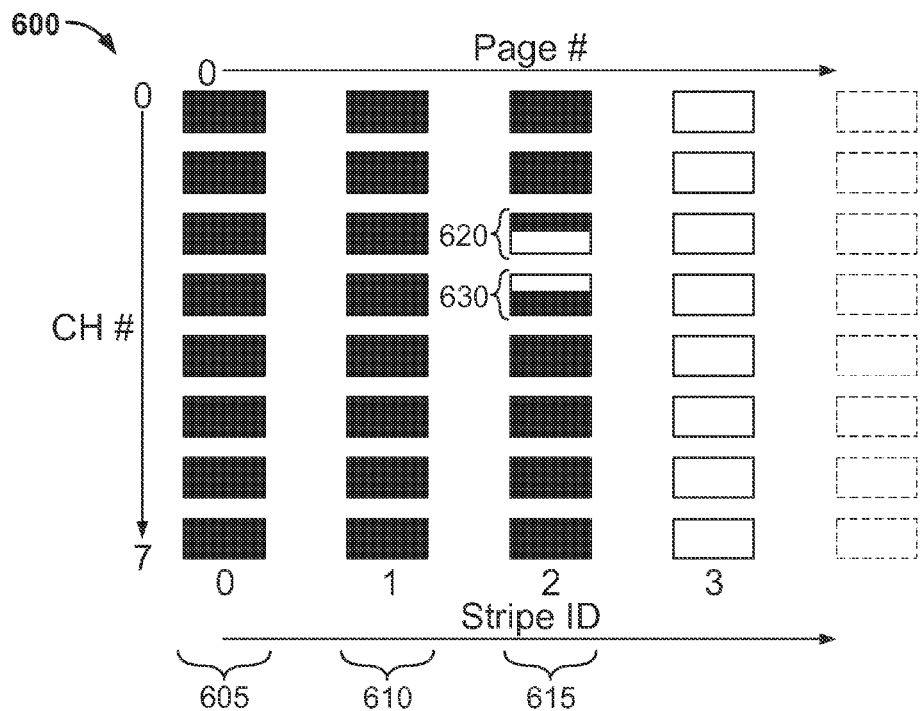
FIG. 6 depicts pages of a storage medium including a partially written stripe for a system in which an SSD controller employing a write buffer in accordance with some embodiments.

FIG. 6 depicts pages of a storage medium including a partially written stripe for a system in which an SSD controller employing a write buffer in accordance with some embodiments. In FIG. 6, each rectangular box denotes a page of the storage medium and rows correspond to different data transfer channels while columns correspond to different stripes (thus, in the example of FIG. 6, each stripe contains exactly six pages). Further, a shaded page or a portion of a shaded page denotes that that page or portion of that page, respectively, has been written to by the SSD controller. A non-shaded page or portion of a page denotes that the page or portion of a page, respectively, has not been written to.

The SSD controller of FIG. 6 accumulates a full stripe of data and writes full stripes of data at a time. Accordingly, stripes 605 and 610 are fully written to as shown by the shaded rectangles in FIG. 6. On the other hand, a power down event occurs while the SSD controller is writing to stripe 615. In particular, the power down event occurs while the SSD controller is writing to page 620 and so the page 620 is only partially written to as reflected in the partial shading of the page 620. When the SSD controller resumes writing at a later time (e.g., after a power on), page 620 is not written to again. Rather, writing resumes at an intermediate address of the next page, i.e., page 630, and this is reflected in the partial shading of the page 630 in FIG. 6.

Figure 7:
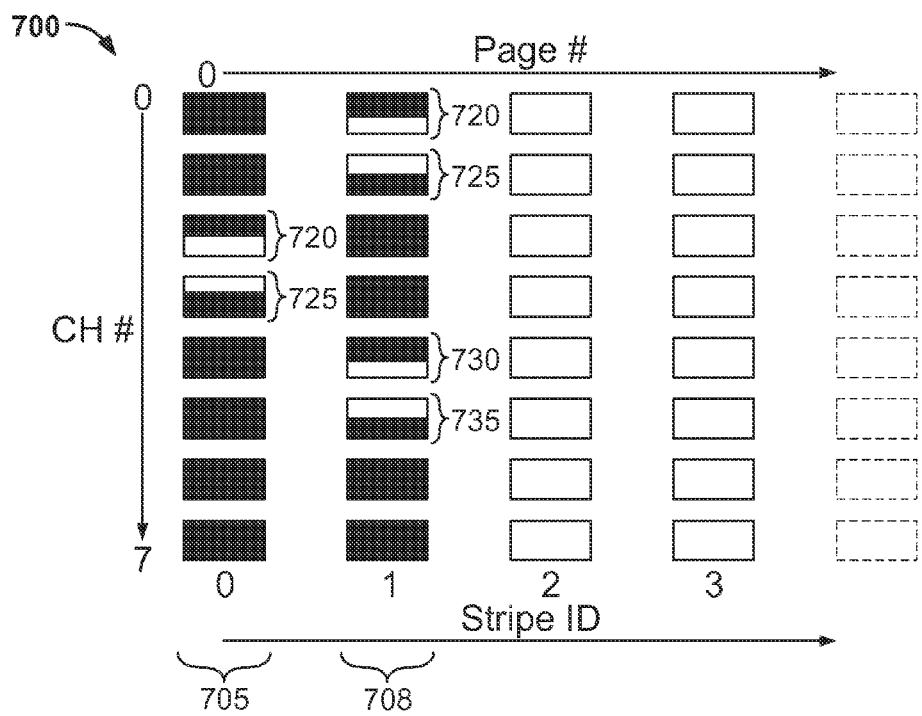
FIG. 7 depicts pages of a storage medium including a partially written stripe for a system in which a SSD controller does not employ a write buffer in accordance with some embodiments.

FIG. 7 depicts pages of a storage medium including a partially written stripe for a system in which a SSD controller does not employ a write buffer in accordance with some embodiments. As in FIG. 6, each rectangular box of FIG. 7 denotes a page of the storage medium and rows correspond to different data transfer channels while columns correspond to different stripes. Further, a shaded page (or a portion of a shaded page) denotes that that page (or portion of that page) has been written to by the SSD controller. A non-shaded page or portion of a page denotes that the page or portion of a page has not been written to.

The SSD controller of FIG. 7 writes data to a storage medium without use of a write buffer. Accordingly, there are many unwritten gaps in the pages of FIG. 7. For example, while stripes 705 and 708 have generally been written to, there are gaps of unwritten data between pages 710 and 715, pages 720 and 725, and pages 730 and 735. Each of these gaps corresponds to the end of one write session of the SSD controller and the start of another.

Whether a SSD controller uses a write buffer or otherwise, the gaps in data written among pages may be reclaimed through execution of periodic recycling activity designed to rewrite data so as to close gaps of unwritten data. This process is known as "garbage collection." According to a first option for performing garbage collection, a unit of pages are selected, where the unit is not an integral number of stripes. The firmware of the SSD controller rewrites data so as to close gaps and tracks stripes that are completely freed up through the garbage collection process. According to a second option for performing garbage collection, the erase unit is an integral number of stripes.

Figure 8:
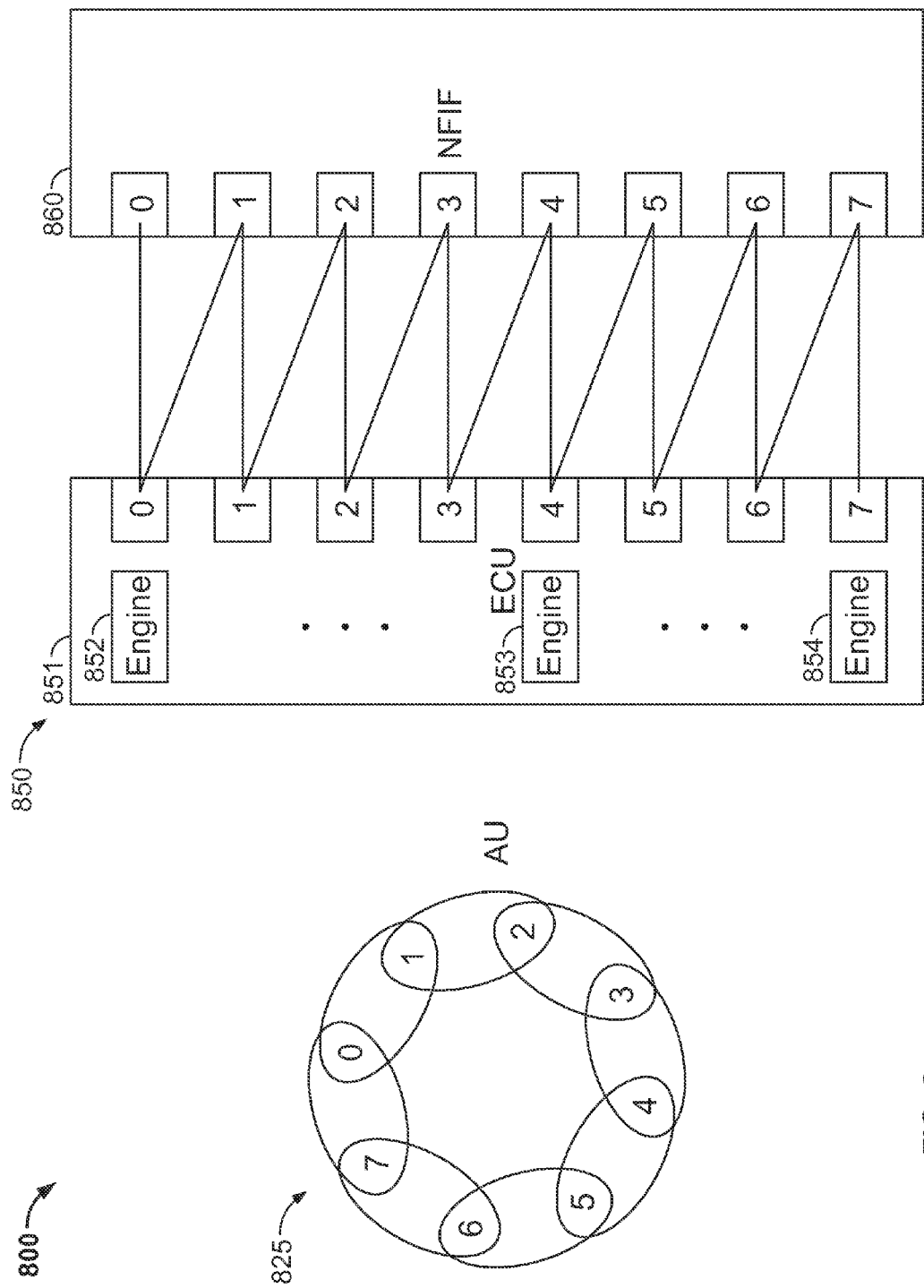
FIG. 8 illustrates a case where a single AU is accessible by a single channel or, at most, two adjacent channels in accordance with some embodiments.

In some implementations, the assignment of AUs is constrained based on data transfer channels employed by the SSD controller. In particular, in these implementations, a single AU may be accessible by a single channel or else may be accessible by at most two adjacent channels (where, the first and last channels are considered to be adjacent). This constraint is illustrated in FIG. 8 by diagram 825 for a case of a SSD controller using eight channels labeled 0 through 7. As depicted in the diagram 825, a given AU may span channels 1 and 2, or channels 2 and 3, or channels 3 and 4, or channels 4 and 5, or channels 5 and 6, or channels 6 and 7, or channels 7 and 0, or channels 0 and 1.

The reason for this constraint is that it simplifies routing of data between an error control unit (ECU) and a NAND flash interface (NFIF) 860. In particular, as illustrated in diagram 850, the ECU 851 contains a number of ECC engines. A total of eight ECC engines, including ECC engines 852, 853, and 854, are depicted in the diagram 850 although, as one be understood by one of ordinary skill, based on the disclosure and teachings herein, more or fewer ECC engines are possible. The constraint that each AU be accessible by a single channel or else by at most two adjacent channels limits the output of each engine to at most two NAND channels of the NFIF 860. For example, as depicted in FIG. 8, the output of the engine 853 is communicatively coupled to channels four and five of the NFIF 860.

Figure 9:
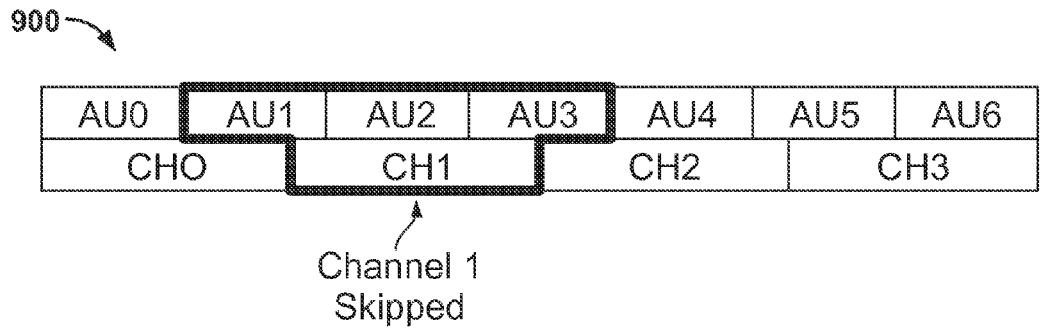
FIG. 9 depicts seven AUs and their respective associated channels in accordance with some embodiments.

Another advantage of constraining each AU to be accessible by a single channel or else by at most two adjacent channels limits the output of each engine to at most two NAND channels of the NFIF 860 is that it limits a number of AUs lost when a channel is to be skipped during a read process (e.g., due to a timing or data corruption error). This is illustrated in FIG. 9. In particular, illustration 900 depicts seven AUs, denoted AU0 through AU6, and the channels associated with each of them (the channels are denoted CH0 through CH3). For example, AU0 is associated only with CH0, while AU1 is associated with both CH0 and CH1. Next suppose that CH1 must be skipped during a read or write process. In this case, only three AUs, AU1, AU2, and AU3 are dropped. If each AU were associated with multiple channels, then it is likely that skipping channel 1 would result in a larger number of AUs being dropped.

Figure 10:
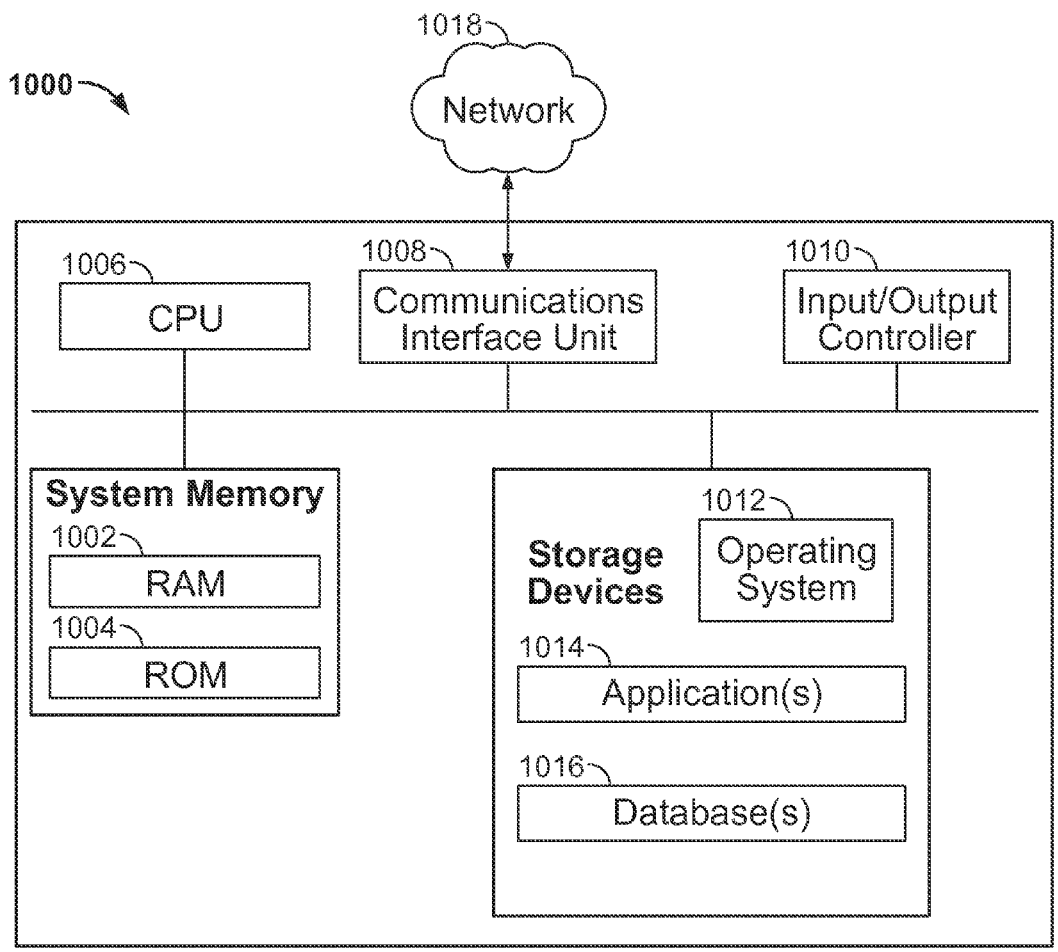
FIG. 10 shows an illustrative block diagram of a computing device for performing any of the processes described herein in accordance with some embodiments.

FIG. 10 shows an illustrative block diagram of a computing device for performing any of the processes described herein in accordance with some embodiments. The computing device 1000 comprises at least one communications interface unit, an input/output controller 1010, system memory, and one or more data storage devices. The system memory includes at least one random access memory (RAM 1002) and at least one read-only memory (ROM 1004). All of these elements are in communication with a central processing unit (CPU 1006) to facilitate the operation of the computing device 1000. The computing device 1000 may be configured in many different ways. For example, the computing device 1000 may be a conventional standalone computer or alternatively, the functions of computing device 1000 may be distributed across multiple computer systems and architectures. In FIG. 10, the computing device 1000 is linked, via network 1018 or local network, to other servers or systems.

The computing device 1000 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1308 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1006 comprises a processor, such as one or more conventional microprocessors and one or more supplementary co-processors such as math co-processors for offloading workload from the CPU 1006. The CPU 1006 is in communication with the communications interface unit 1008 and the input/output controller 1010, through which the CPU 1006 communicates with other devices such as other servers, user terminals, or devices. The communications interface unit 1008 and the input/output controller 1010 may include multiple communication channels for simultaneous communication with, for example, other processors, servers or client terminals.

The CPU 1006 is also in communication with the data storage device. The data storage device may comprise an appropriate combination of magnetic, optical or semiconductor memory, and may include, for example, RAM 1002, ROM 1004, flash drive, an optical disc such as a compact disc or a hard disk or drive. The CPU 1006 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1006 may be connected to the data storage device via the communications interface unit 1008. The CPU 1006 may be configured to perform one or more particular processing functions.

The data storage device may store, for example, (i) an operating system 1012 for the computing device 1000; (ii) one or more applications 1014 (e.g., computer program code or a computer program product) adapted to direct the CPU 1006 in accordance with the systems and methods described here, and particularly in accordance with the processes described in detail with regard to the CPU 1006; or (iii) database(s) 1016 adapted to store information that may be utilized to store information required by the program.

The operating system 1012 and applications 1014 may be stored, for example, in a compressed, an uncompiled and an encrypted format, and may include computer program code. The instructions of the program may be read into a main memory of the processor from a computer-readable medium other than the data storage device, such as from the ROM 1004 or from the RAM 1002. While execution of sequences of instructions in the program causes the CPU 1006 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to reducing an amount of peak power consumption as described herein. The program also may include program elements such as an operating system 1012, a database management system and "device drivers" that allow the processor to interface with computer peripheral devices (e.g., a video display, a keyboard, a computer mouse, etc.) via the input/output controller 1010.

The term "computer-readable medium" as used herein refers to any non-transitory medium that provides or participates in providing instructions to the processor of the computing device 1000 (or any other processor of a device described herein) for execution. Such a medium may take many forms, including but not limited to, non-volatile medium and volatile medium. Non-volatile medium include, for example, optical, magnetic, or opto-magnetic disks, or integrated circuit memory, such as flash memory. Volatile medium include dynamic random access memory (DRAM), which typically constitutes the main memory. Common forms of computer-readable medium include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable medium may be involved in carrying one or more sequences of one or more instructions to the CPU 1006 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1000 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A system for writing data to a storage medium, the system comprising:
    interface circuitry configured to interface with a stripe of the storage medium via one or more data transfer channels, the stripe comprising a plurality of pages of the storage medium;
    partition circuitry configured to receive a data stream and partition the data stream into a plurality of allocation units (AUs), each AU in the plurality of AUs having a same pre-determined byte length; and
    write circuitry configured to write a first portion of a selected AU from the plurality of AUs to a first page of the plurality of pages and a second portion of the selected AU to a second page of the plurality of pages by consecutively writing bytes of the selected AU from a starting byte on the first page to an ending byte on the second page.

2. The system of claim 1, wherein the write circuitry is configured to write the plurality of AUs to the stripe based on an ordered sequence of the pages.

3. The system of claim 1, wherein the write circuitry comprises a write buffer and wherein the write circuitry is configured to write to the storage medium after an amount of data equal to a length of the stripe accumulates in the write buffer.

4. The system of claim 1, wherein the plurality of pages are located on a plurality of storage devices.

5. The system of claim 1, wherein the write circuitry is configured to access a first of the plurality of pages using a first of the one or more data transfer channels and access a second of the plurality of pages using a second of the one or more data transfer channels.

6. The system of claim 1, wherein each AU in the plurality of AUs is associated with at most two data transfer channels from the one or more data transfer channels, and wherein the two data transfer channels are adjacent.

7. The system of claim 1, further comprising collection circuitry configured to:
   read data stored in the storage medium;
   detect bytes among the read data that are not written to; and
   rewrite the read data to the storage medium, wherein the rewriting writes over the unwritten bytes.

8. The system of claim 1, further comprising error correction (ECC) circuitry configured to:
   read data stored in the stripe of the storage medium; and
   calculate an error correction sequence corresponding to the read data.

9. The system of claim 8, wherein the write circuitry is configured to:
   receive the error correction sequence; and
   write the error correction sequence to a last page of the stripe of the storage medium.

10. The system of claim 1, wherein the write circuitry is configured to write the plurality of AUs to a first portion of the stripe while leaving a second portion of the stripe unwritten to.

11. A method for writing data to a storage medium, the method comprising:
   interfacing with a stripe of the storage medium via one or more data transfer channels, the stripe comprising a plurality of pages of the storage medium;
   receiving a data stream and partitioning the data stream into a plurality of allocation units (AUs), each AU in the plurality of AUs having a same pre-determined byte length; and
   writing a first portion of a selected AU from the plurality of AUs to a first page of the plurality of pages and a second portion of the selected AU to a second page of the plurality of pages by consecutively writing bytes of the selected AU from a starting byte on the first page to an ending byte on the second page.

12. The method of claim 11, further comprising writing the plurality of AUs to the stripe based on an ordered sequence of the pages.

13. The method of claim 11, further comprising writing the storage medium in response to a determination that an amount of data equal to a length of the stripe accumulates in a write buffer.

14. The method of claim 11, wherein the plurality of pages are located on a plurality of storage devices.

15. The method of claim 11, further comprising accessing a first of the plurality of pages using a first of the one or more data transfer channels and accessing a second of the plurality of pages using a second of the one or more data transfer channels.

16. The method of claim 11, wherein each AU in the plurality of AUs is associated with at most two data transfer channels from the one or more data transfer channels, and wherein the two data transfer channels are adjacent.

17. The method of claim 11, further comprising:
   reading data stored in the storage medium;
   detecting bytes among the read data that are not written to; and
   rewriting the read data to the storage medium, wherein the rewriting writes over the unwritten bytes.

18. The method of claim 11, further comprising: reading data stored in the stripe of the storage medium; and
   calculating an error correction sequence corresponding to the read data.

19. The method of claim 18, further comprising:
   receiving the error correction sequence; and
   writing the error correction sequence to a last page of the stripe of the storage medium.

20. The method of claim 11, further comprising writing the plurality of AUs to a first portion of the stripe while leaving a second portion of the stripe unwritten to.

* * * * *